United States Patent
Zhao et al.

(10) Patent No.: US 12,222,891 B2
(45) Date of Patent: Feb. 11, 2025

(54) HANDSHAKE CONTROLLERS FOR CHARGING PROTOCOLS RELATED TO MULTIPORT CHARGERS AND METHODS THEREOF

(71) Applicant: ON-BRIGHT ELECTRONICS (SHANGHAI) CO., LTD., Shanghai (CN)

(72) Inventors: Zhiqin Zhao, Shanghai (CN); Miao Li, Shanghai (CN); Guannan Wang, Shanghai (CN); Qiang Luo, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/965,647

(22) Filed: Oct. 13, 2022

(65) Prior Publication Data

US 2023/0123847 A1    Apr. 20, 2023

(30) Foreign Application Priority Data

Oct. 14, 2021    (CN) .......................... 202111199893.3

(51) Int. Cl.
  *G06F 13/42*    (2006.01)
  *G06F 13/38*    (2006.01)

(52) U.S. Cl.
  CPC ........ *G06F 13/4286* (2013.01); *G06F 13/385* (2013.01); *G06F 2213/0042* (2013.01)

(58) Field of Classification Search
  CPC ................... G06F 4286/385; G06F 2213/0042
  See application file for complete search history.

(56) References Cited

U.S. PATENT DOCUMENTS

| | | |
|---|---|---|
| 7,135,836 B2 | 11/2006 | Kutkut et al. |
| 9,915,962 B2 | 3/2018 | Lee et al. |
| 10,530,108 B2 | 1/2020 | Liu |
| 10,673,256 B2 | 6/2020 | Li |
| 11,169,569 B2 | 11/2021 | Lee |

(Continued)

FOREIGN PATENT DOCUMENTS

| | | |
|---|---|---|
| CN | 103309835 A | 9/2013 |
| TW | I648635 B | 1/2019 |

OTHER PUBLICATIONS

Taiwan Intellectual Property Office, Office Action issued Jan. 7, 2023, in Application No. 110147996.

(Continued)

*Primary Examiner* — Henry Tsai
*Assistant Examiner* — Aurangzeb Hassan
(74) *Attorney, Agent, or Firm* — Faegre Drinker Biddle & Reath LLP

(57) ABSTRACT

Handshake controller and handshake control method for one or more charging protocols. For example, a handshake controller for one or more charging protocols includes: a port detection unit connected to a plurality of USB ports and configured to generate a detection signal; a port selection unit configured to receive the detection signal and connected to the plurality of USB ports; an interface unit connected to the port selection unit; and a digital handshake unit connected to the interface unit; wherein the port detection unit is further configured to: determine whether a single USB port of the plurality of USB ports is connected to a load device.

18 Claims, 9 Drawing Sheets

(56) References Cited

U.S. PATENT DOCUMENTS

| | | | |
|---|---|---|---|
| 11,181,966 B2* | 11/2021 | Waters | G06F 1/266 |
| 11,190,038 B2 | 11/2021 | Jang et al. | |
| 11,507,165 B2 | 11/2022 | Walsh | |
| 12,072,822 B2 | 8/2024 | Joyce et al. | |
| 2012/0166173 A1 | 6/2012 | Fischbach | |
| 2013/0151731 A1 | 6/2013 | Lai et al. | |
| 2016/0352101 A1 | 12/2016 | Koo | |
| 2018/0060270 A1* | 3/2018 | Schnell | G06F 13/4022 |
| 2018/0131148 A1 | 5/2018 | Liu | |
| 2018/0150121 A1* | 5/2018 | Basterash | H02J 7/0042 |
| 2019/0045654 A1* | 2/2019 | Abbondanzio | H05K 7/1494 |
| 2020/0183471 A1* | 6/2020 | Liu | G06F 13/4282 |
| 2020/0264989 A1* | 8/2020 | Wente | G06F 13/4282 |
| 2020/0327080 A1* | 10/2020 | Sunwoo | G06F 1/1626 |
| 2020/0341936 A1* | 10/2020 | Hsu | G06F 13/4286 |
| 2020/0394150 A1* | 12/2020 | Lanka | G06F 13/4226 |
| 2021/0111578 A1 | 4/2021 | Yingyang | |
| 2021/0397235 A1* | 12/2021 | Schneider | H02J 7/0044 |

OTHER PUBLICATIONS

United States Patent and Trademark Office, Office Action mailed Nov. 22, 2024, in U.S. Appl. No. 18/111,810.

* cited by examiner

HANDSHAKE CONTROLLERS FOR CHARGING PROTOCOLS RELATED TO MULTIPORT CHARGERS AND METHODS THEREOF

1. CROSS-REFERENCES TO RELATED APPLICATIONS

This application claims priority to Chinese Patent Application No. 202111199893.3, filed Oct. 14, 2021, incorporated by reference herein for all purposes.

2. BACKGROUND OF THE INVENTION

Certain embodiments of the present invention are directed to circuits. More particularly, some embodiments of the invention provide handshake controllers and methods for charging protocols. Merely by way of example, some embodiments of the invention have been applied to multiport chargers. But it would be recognized that the invention has a much broader range of applicability.

Conventional fast chargers, such as certain power banks, often each include multiple Universal Serial Bus (USB) ports. Each of these multiple USB ports usually is configured to provide a handshake for a fast charging protocol (e.g., Power Delivery and/or Quick Charge), but if two or more USB ports of the same fast charger are connected to load devices, each of the two or more USB ports can provide a handshake for only a regular charging protocol (e.g., the Apple 2.4A charging protocol and/or the BC 1.2 charging protocol) that is not a fast charging protocol, and the regular charging protocol uses a 5-volt charging voltage. For example, a load device is a portable electronic device (e.g., a laptop computer and/or a mobile phone).

FIG. 1 is a simplified diagram showing a conventional handshake controller for one or more charging protocols as part of a multiport fast charger. The handshake controller 100 includes terminals 180, 182, 190 and 192, input/output interface units 120 and 130, and a digital handshake unit 110.

The handshake controller 100 supports at least USB ports 188 and 198 of the multiport fast charger. The USB port 188 includes the terminals 180 and 182. The terminal 180 is a positive data pin, and the terminal 182 is a negative data pin. Both the terminals 180 and 182 are connected to the input/output interface unit 120. The input/output interface unit 120 is connected to the digital handshake unit 110. Additionally, the USB port 188 also includes a supply voltage pin and a ground voltage pin. The USB port 198 includes the terminals 190 and 192. The terminal 190 is a positive data pin, and the terminal 192 is a negative data pin. Both the terminals 190 and 192 are connected to the input/output interface unit 130. The input/output interface unit 130 is connected to the digital handshake unit 110. Additionally, the USB port 198 also includes a supply voltage pin and a ground voltage pin.

The USB port 188 communicates with the digital handshake unit 110 through the input/output interface unit 120, and the USB port 198 communicates with the digital handshake unit 110 through the input/output interface unit 130. The digital handshake unit 110 includes a digital circuit to implement a handshake for a fast charging protocol and a handshake for a regular charging protocol that is not a fast charging protocol. For example, the regular charging protocol uses a 5-volt charging voltage at a supply voltage pin of a USB port.

As shown in FIG. 1, different USB ports use different input/output interface units to communicate with the same digital handshake unit 110. The conventional handshake controller 100 often needs complex circuit structures.

Hence it is highly desirable to improve the technique for handshake controllers for charging protocols.

3. BRIEF SUMMARY OF THE INVENTION

Certain embodiments of the present invention are directed to circuits. More particularly, some embodiments of the invention provide handshake controllers and methods for charging protocols. Merely by way of example, some embodiments of the invention have been applied to multiport chargers. But it would be recognized that the invention has a much broader range of applicability.

According to some embodiments, a handshake controller for one or more charging protocols includes: a port detection unit connected to a plurality of USB ports and configured to generate a detection signal; a port selection unit configured to receive the detection signal and connected to the plurality of USB ports; an interface unit connected to the port selection unit; and a digital handshake unit connected to the interface unit; wherein the port detection unit is further configured to: determine whether a single USB port of the plurality of USB ports is connected to a load device; and if the single USB port of the plurality of USB ports is connected to the load device and no other USB port of the plurality of USB ports is connected to any load device, generate the detection signal identifying the single USB port that is connected to the load device; wherein the port selection unit is further configured to, if the detection signal identifies the single USB port that is connected to the load device, connect the single USB port to the interface unit to establish one or more signal communications between the single USB port and the digital handshake unit through the interface unit.

According to certain embodiments, a handshake control method for one or more charging protocols includes: determining, by a port detection unit, whether a single USB port of a plurality of USB ports is connected to a load device; if the single USB port of the plurality of USB ports is connected to the load device and no other USB port of the plurality of USB ports is connected to any load device, generating, by the port detection unit, a detection signal identifying the single USB port that is connected to the load device; receiving the detection signal by a port selection unit; and if the detection signal identifies the single USB port that is connected to the load device, connecting, by the port selection unit, the single USB port to an interface unit; and establishing one or more signal communications between the single USB port and the digital handshake unit through the interface unit.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

Figure 1:
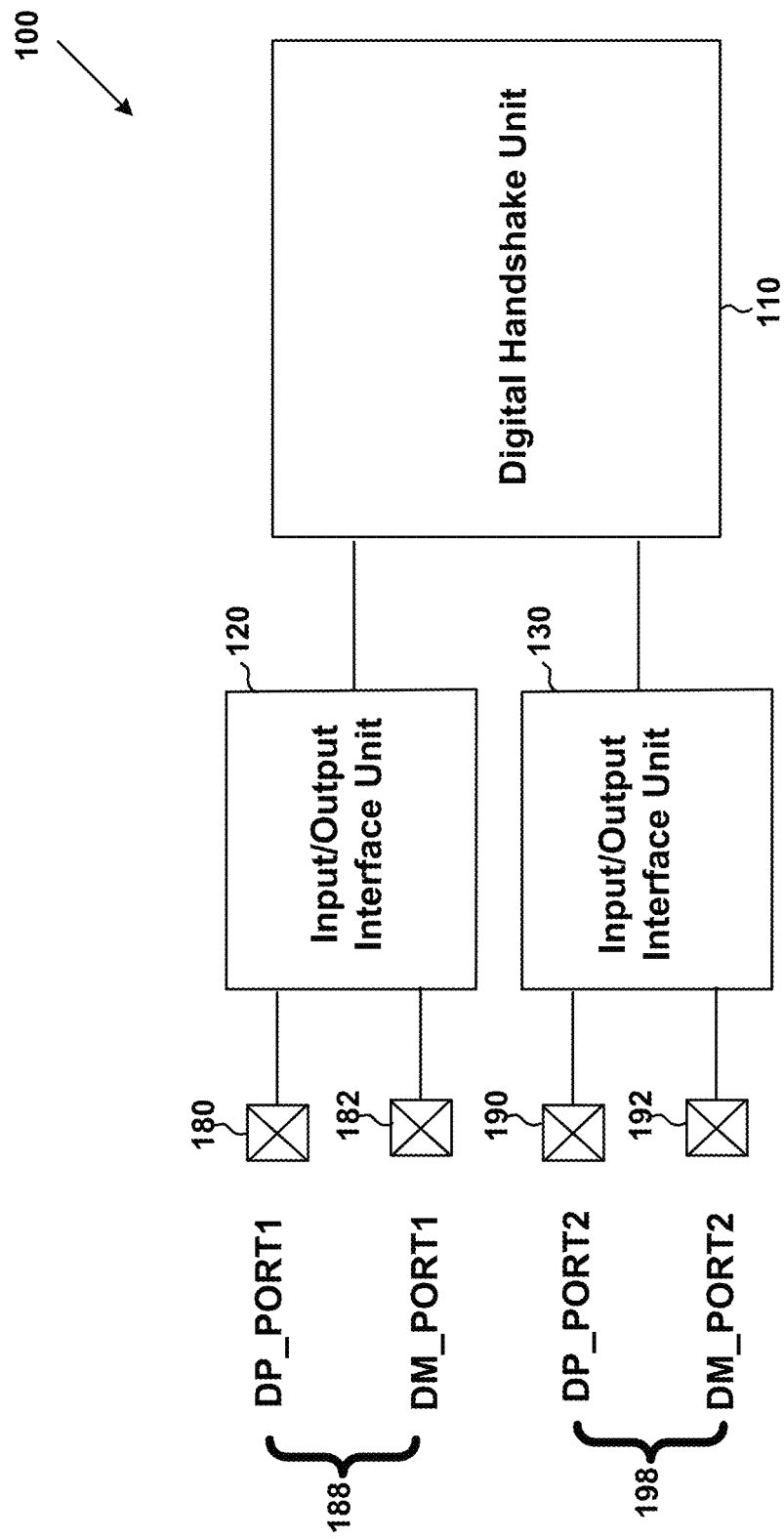
FIG. 1 is a simplified diagram showing a conventional handshake controller for one or more charging protocols as part of a multiport fast charger.
Figure 2:
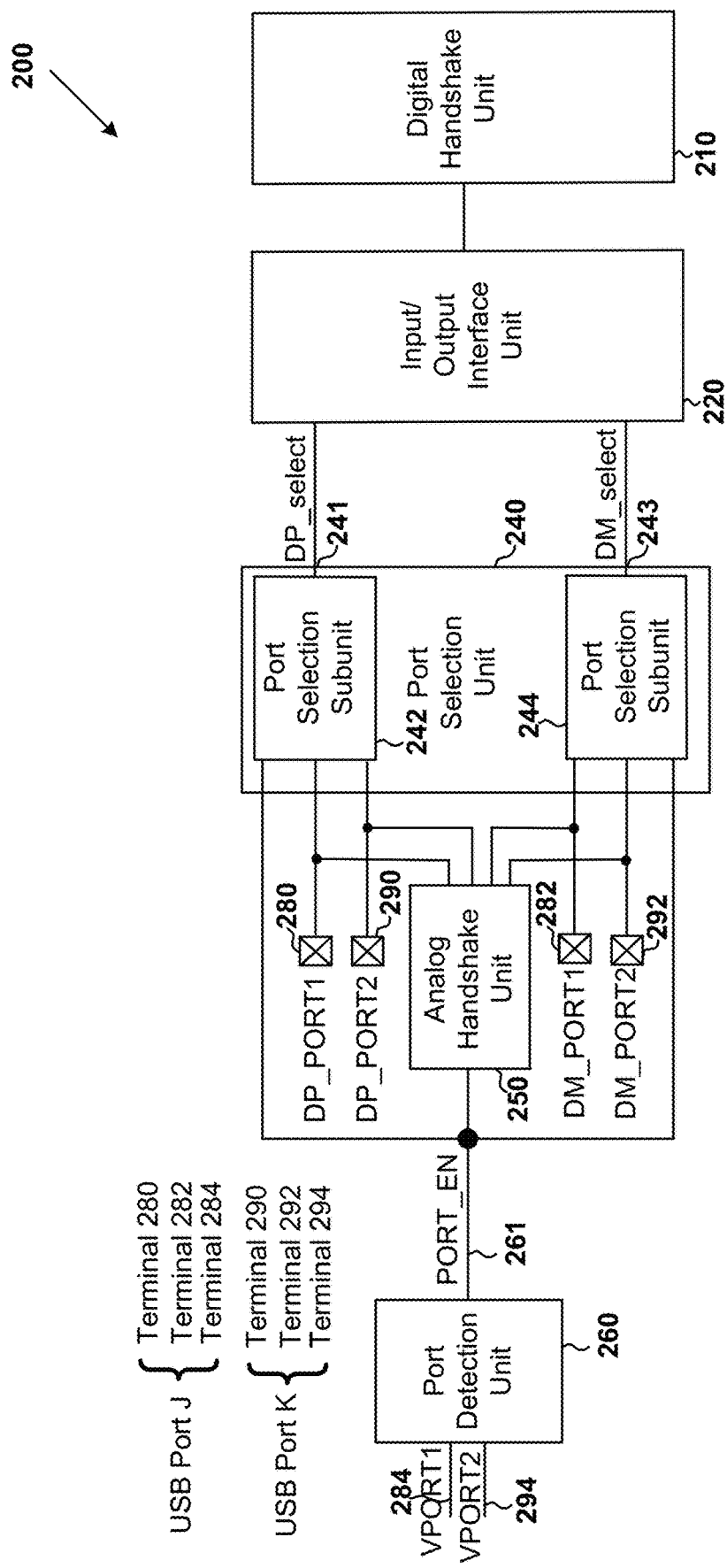
FIG. 2 is a simplified diagram showing a handshake controller for one or more charging protocols according to certain embodiments of the present invention.
Figure 3A:
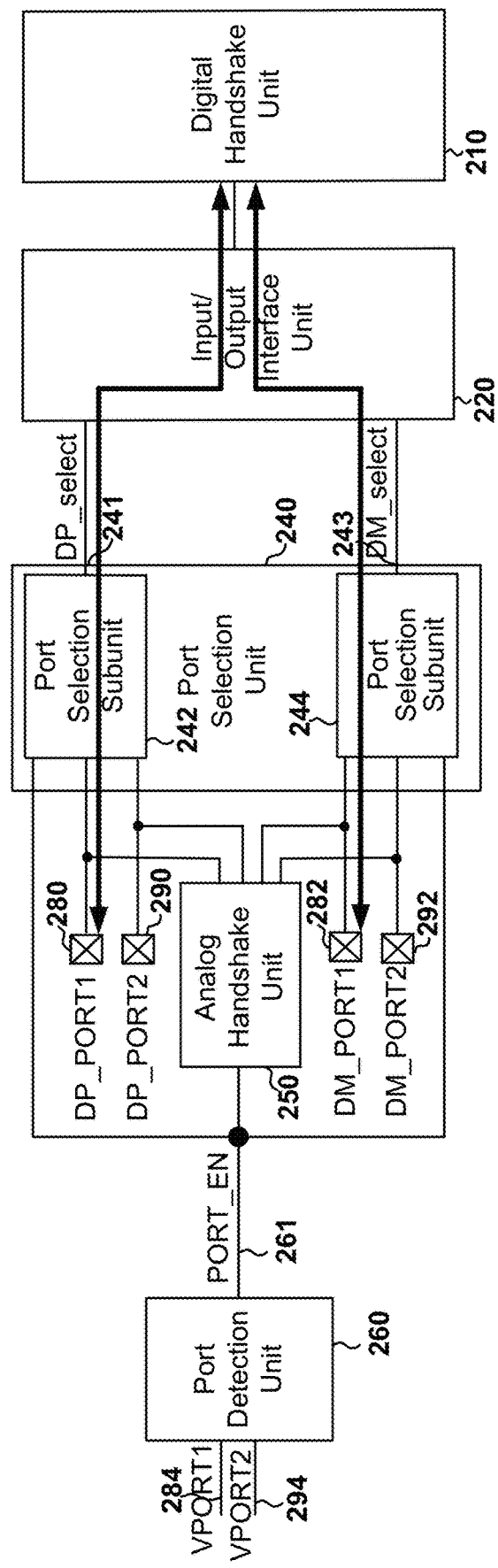
Figure 3B:
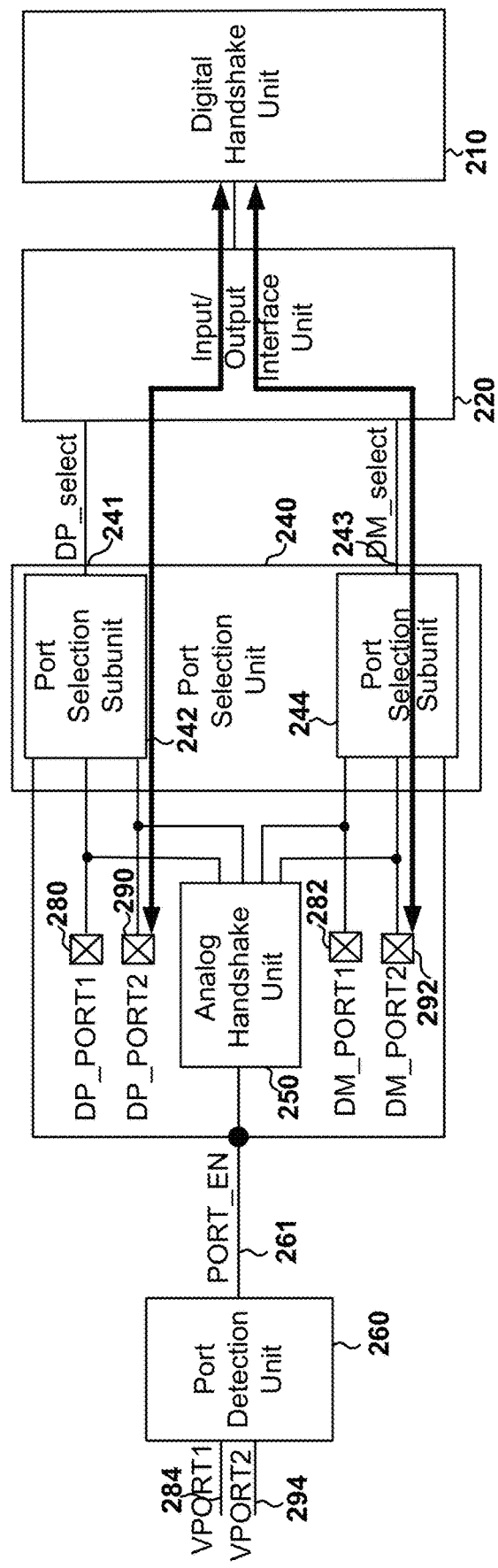
Figure 3C:
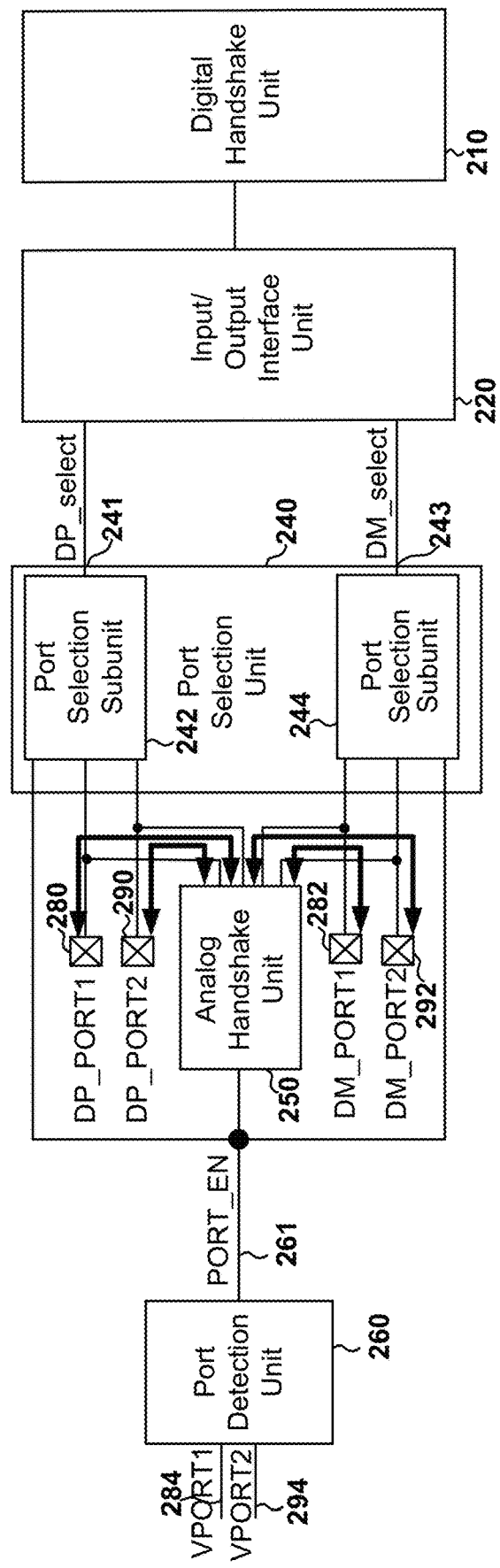

FIG. 3A, FIG. 3B, and FIG. 3C are simplified diagrams showing signal communications between one or more devices connected to one or more USB ports with the handshake controller as shown in FIG. 2 according to some embodiments of the present invention.

Figure 4:
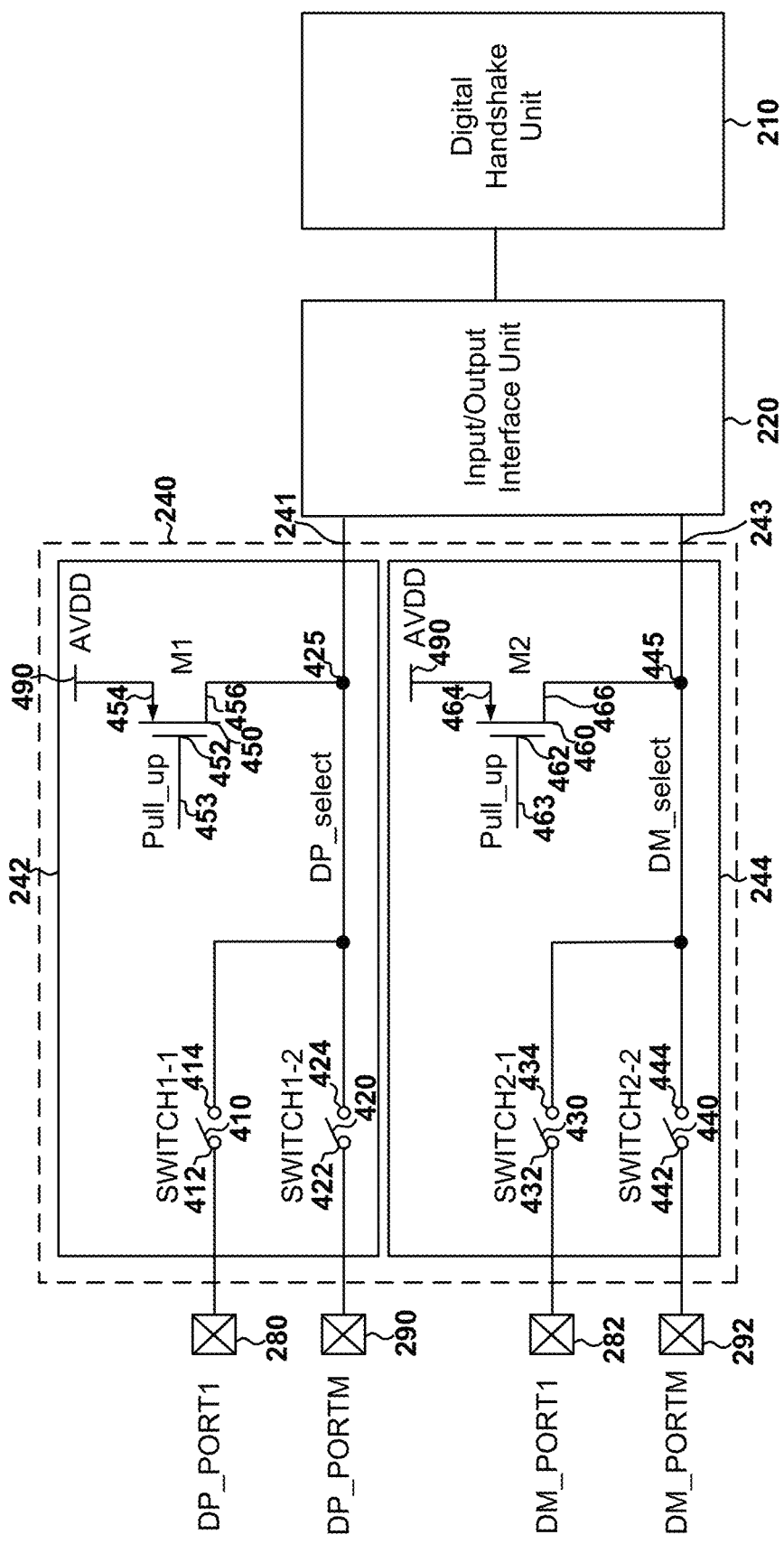

FIG. 4 is a simplified diagram showing certain components of the port selection unit as part of the handshake controller as shown in FIG. 2 according to certain embodiments of the present invention.

Figure 5:
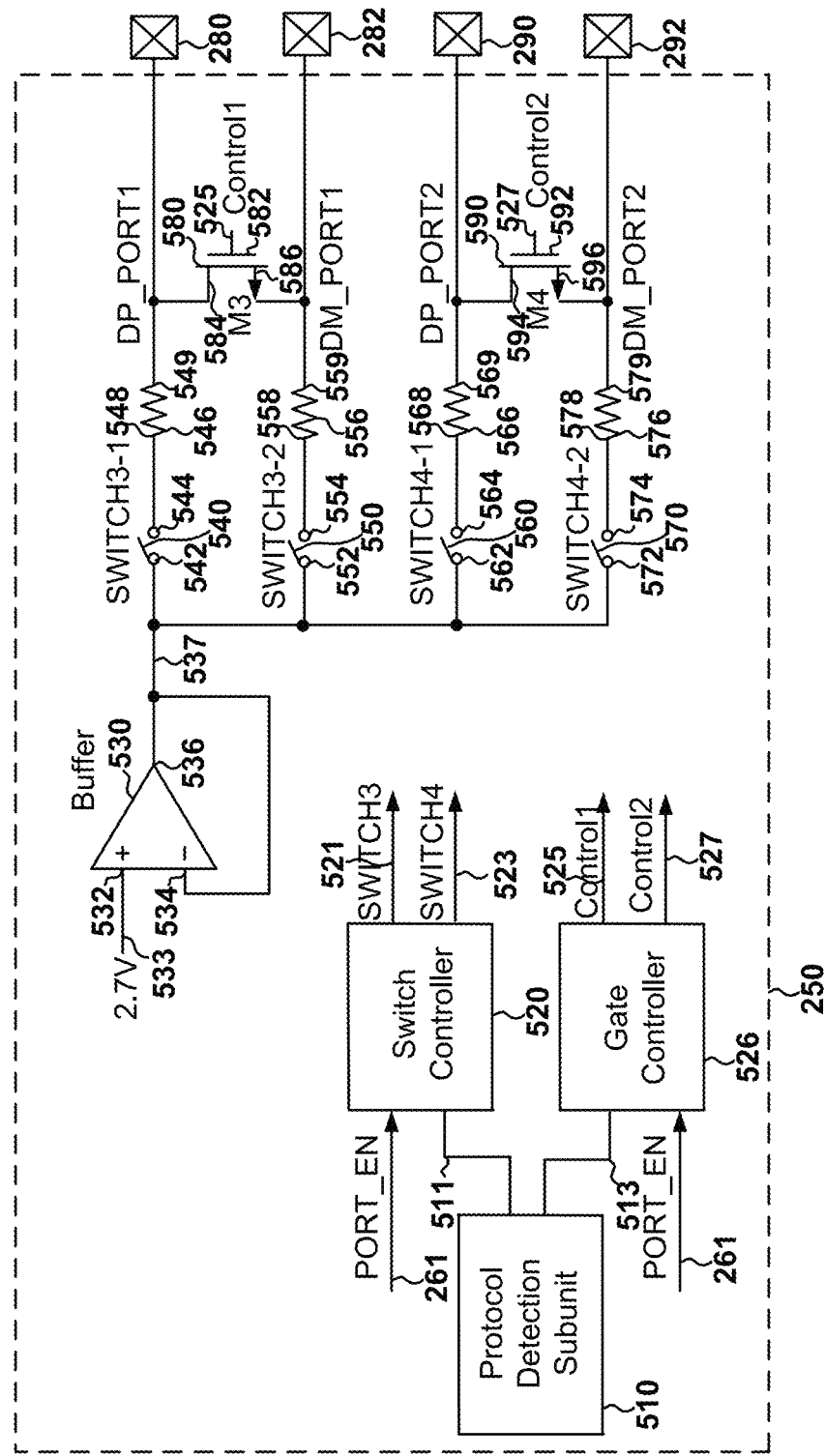

FIG. 5 is a simplified diagram showing certain components of the analog handshake unit as part of the handshake controller as shown in FIG. 2 according to certain embodiments of the present invention.

Figure 6:
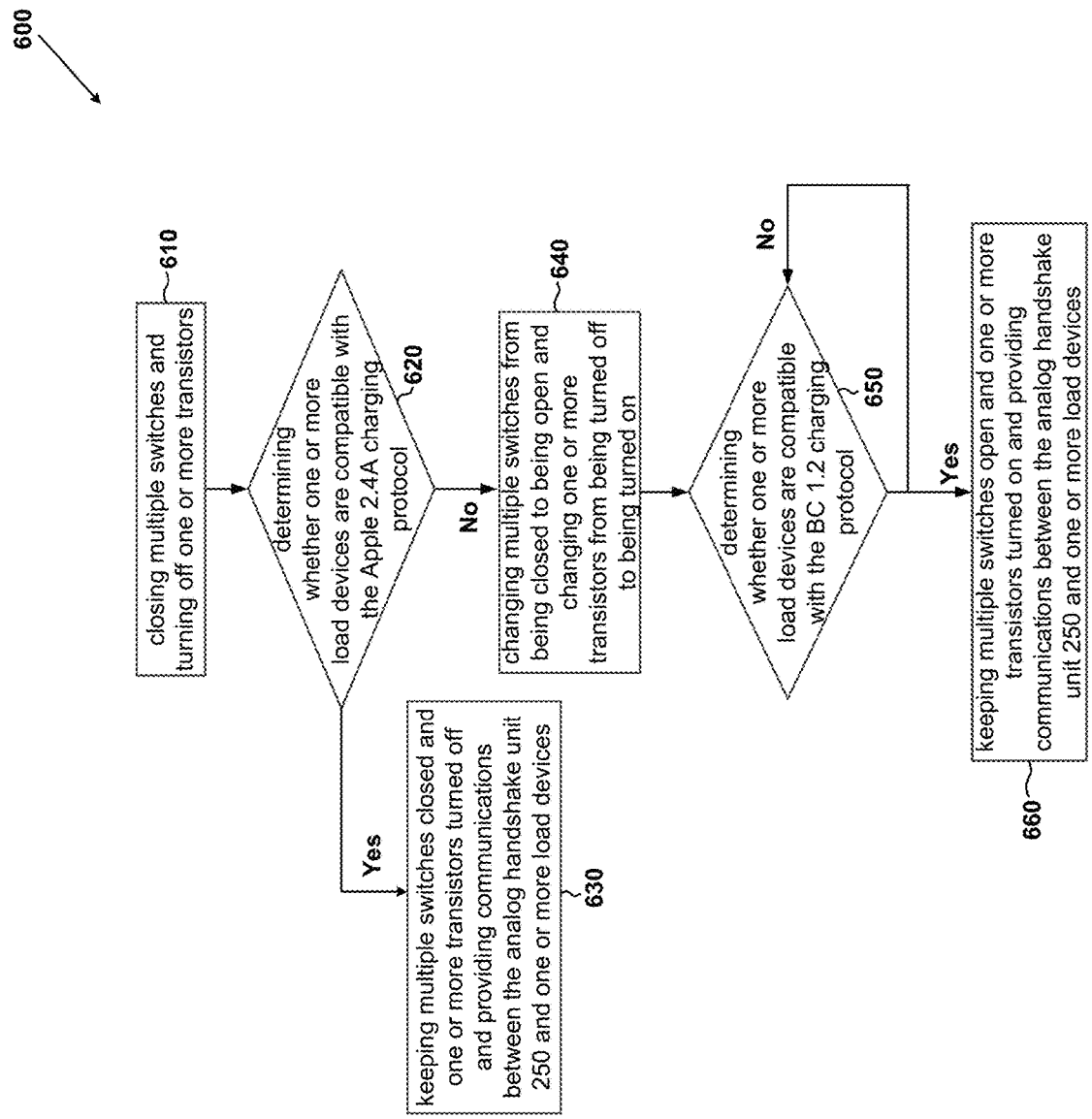

FIG. 6 is a simplified diagram showing a method performed by the analog handshake unit as part of the handshake controller as shown in FIG. 2 according to some embodiments of the present invention.

Figure 7:
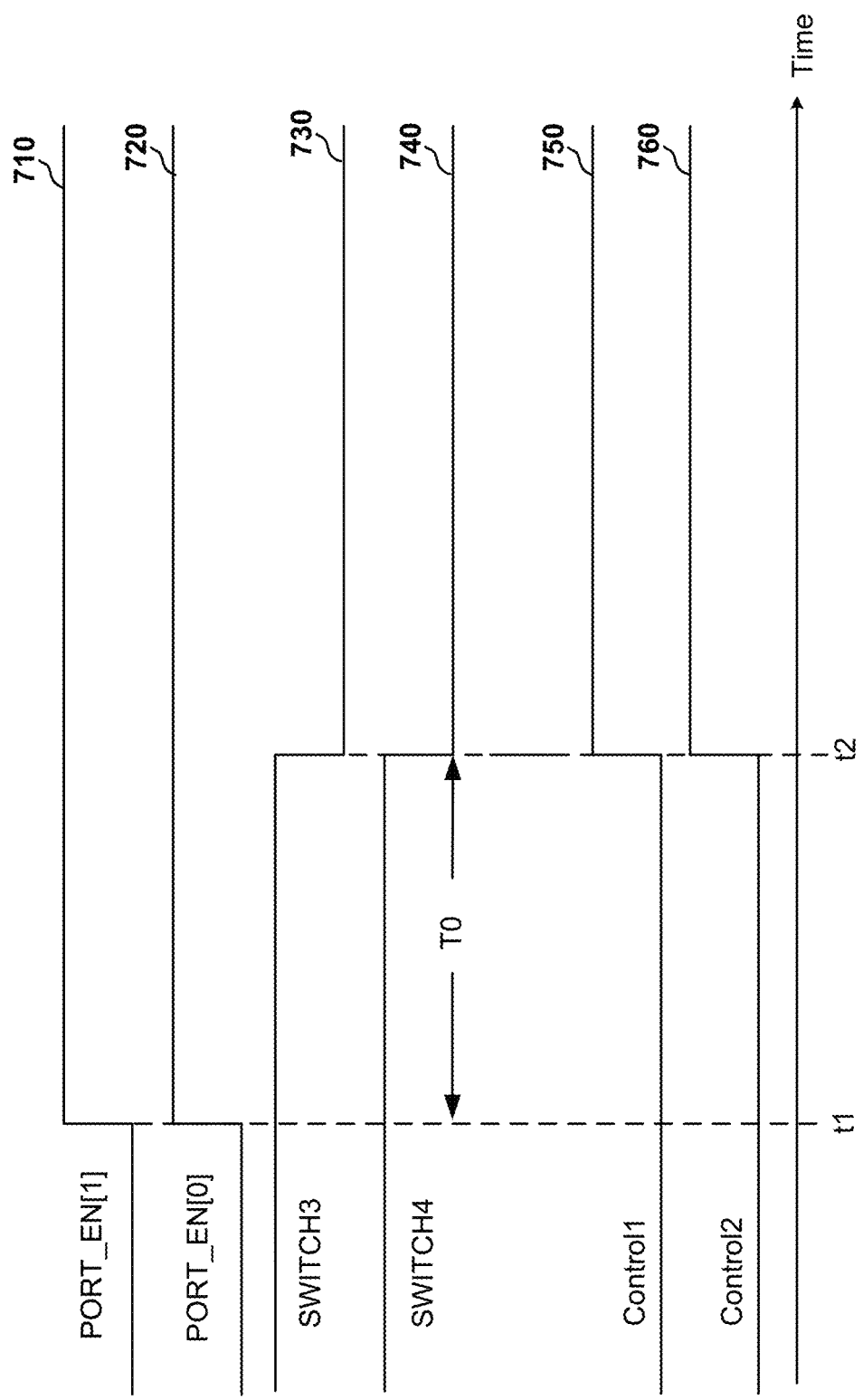

FIG. 7 shows simplified timing diagrams for the analog handshake unit as part of the handshake controller as shown in FIG. 2 according to certain embodiments of the present invention.

5. DETAILED DESCRIPTION OF THE INVENTION

Certain embodiments of the present invention are directed to circuits. More particularly, some embodiments of the invention provide handshake controllers and methods for charging protocols. Merely by way of example, some embodiments of the invention have been applied to multiport chargers. But it would be recognized that the invention has a much broader range of applicability.

FIG. 2 is a simplified diagram showing a handshake controller for one or more charging protocols according to certain embodiments of the present invention. This diagram is merely an example, which should not unduly limit the scope of the claims. One of ordinary skill in the art would recognize many variations, alternatives, and modifications. The handshake controller 200 includes terminals 280, 282, 284, 290, 292 and 294, an input/output interface unit 220, a digital handshake unit 210, a port selection unit 240, an analog handshake unit 250, and a port detection unit 260. For example, the handshake controller 200 is a part of a multiport fast charger that includes a USB port J and a USB port K. As an example, the port selection unit 240 includes a port selection subunit 242 and a port selection subunit 244. Although the above has been shown using a selected group of components for the handshake controller 200, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some examples, the analog handshake unit 250 includes an analog circuit to implement a handshake for a regular charging protocol that is not a fast charging protocol. For example, the regular charging protocol uses a 5-volt charging voltage at a supply voltage pin of a USB port. In certain examples, the digital handshake unit 210 includes a digital circuit to implement a handshake for a fast charging protocol.

According to some embodiments, the handshake controller 200 supports at least the USB port J and the USB port K. In certain examples, the USB port J includes the terminals 280, 282 and 284. For example, the terminal 280 is a positive data pin, the terminal 282 is a negative data pin, and the terminal 284 is a supply voltage pin. As an example, the USB port J also includes a ground voltage pin. In some examples, the USB port K includes the terminals 290, 292 and 294. For example, the terminal 290 is a positive data pin, the terminal 292 is a negative data pin, and the terminal 294 is a supply voltage pin. As an example, the USB port K also includes a ground voltage pin.

According to certain embodiments, the port detection unit 260 is connected to the terminal 284 (e.g., a supply voltage pin) of the USB port J and the terminal 294 (e.g., a supply voltage pin) of the USB port K. In some examples, the port detection unit 260 receives one or more signals from the terminal 284 (e.g., a supply voltage pin) and/or the terminal 294 (e.g., a supply voltage pin), uses the received one or more signals to determine whether the USB port J is connected to a load device and whether the USB port K is connected to a load device, and generates a detection signal 261. For example, a load device is a portable electronic device (e.g., a laptop computer and/or a mobile phone). In certain examples, the detection signal 261 indicates whether the USB port J is connected to a load device and whether the USB port K is connected to a load device. For example, the detection signal 261 (e.g., being equal to 10) indicates that the USB port J is connected to a load device, but the USB port K is not connected to a load device. As an example, the detection signal 261 (e.g., being equal to 01) indicates that the USB port K is connected to a load device, but the USB port J is not connected to a load device. For example, the detection signal 261 (e.g., being equal to 11) indicates that the USB port J is connected to a load device and the USB port K is connected to another load device. As an example, the detection signal 261 (e.g., being equal to 00) indicates that neither the USB port J nor the USB port K is connected to a load device.

In some embodiments, the detection signal 261 is received by the port selection unit 240 and the analog handshake unit 250. For example, if the detection signal 261 indicates that the USB port J is connected to a load device but the USB port K is not connected to a load device, the port selection unit 240 connects the terminal 280 (e.g., a positive data pin) and the terminal 282 (e.g., a negative data pin) of the USB port J to the input/output interface unit 220. As an example, if the detection signal 261 indicates that the USB port K is connected to a load device but the USB port J is not connected to a load device, the port selection unit 240 connects the terminal 290 (e.g., a positive data pin) and the terminal 292 (e.g., a negative data pin) of the USB port K to the input/output interface unit 220.

In certain embodiments, the detection signal 261 is received by the port selection subunit 242 of the port selection unit 240 and the port selection subunit 244 of the port selection unit 240. For example, the port selection subunit 242 is connected to the terminal 280 (e.g., a positive data pin) and the terminal 290 (e.g., a positive data pin) and is connected to the input/output interface unit 220 through a terminal 241. As an example, the port selection subunit 244 is connected to the terminal 282 (e.g., a negative data pin) and the terminal 292 (e.g., a negative data pin) and is connected to the input/output interface unit 220 through a terminal 243. In some examples, if the detection signal 261 indicates that the USB port J is connected to a load device but the USB port K is not connected to a load device, the port selection subunit 242 connects the terminal 280 (e.g., a positive data pin) to the input/output interface unit 220 through the terminal 241, and the port selection subunit 244 connects the terminal 282 (e.g., a negative data pin) to the input/output interface unit 220 through the terminal 243. In some examples, if the detection signal 261 indicates that the USB port K is connected to a load device but the USB port J is not connected to a load device, the port selection subunit 242 connects the terminal 290 (e.g., a positive data pin) to the input/output interface unit 220 through the terminal 241, and the port selection subunit 244 connects the terminal 292 (e.g., a negative data pin) to the input/output interface unit 220 through the terminal 243.

According to some embodiments, if the detection signal 261 indicates that the USB port J is connected to a load device but the USB port K is not connected to a load device, the terminal 280 (e.g., a positive data pin) and the terminal 282 (e.g., a negative data pin) are connected to the input/output interface unit 220 through the port selection unit 240, so that the port selection unit 240 enables signal communication between the USB port J and the digital handshake unit 210. In certain examples, if the detection signal 261 indicates that the USB port J is connected to a load device but the USB port K is not connected to a load device, the digital handshake unit 210 communicates with the load device that is connected to USB port J and determines whether or not to establish a handshake for a fast charging protocol with the load device that is connected to the USB port J. For example, if the load device connected to the USB port J is compatible with a fast charging protocol, the digital handshake unit 210 determines to establish a handshake for the fast charging protocol with the load device connected to the USB port J and establishes a handshake for the fast charging protocol with the load device connected to the USB port J. As an example, if the load device connected to the USB port J is not compatible with a fast charging protocol, the digital handshake unit 210 determines not to establish a handshake for the fast charging protocol with the load device connected to the USB port J and the analog handshake unit 250 is used to determine whether or not to establish a handshake for a regular charging protocol that is not a fast charging protocol with the load device connected to the USB port J.

According to certain embodiments, if the detection signal 261 indicates that the USB port K is connected to a load device but the USB port J is not connected to a load device, the terminal 290 (e.g., a positive data pin) and the terminal 292 (e.g., a negative data pin) are connected to the input/output interface unit 220 through the port selection unit 240, so that the port selection unit 240 enables signal communication between the USB port K and the digital handshake unit 210. In some examples, if the detection signal 261 indicates that the USB port K is connected to a load device but the USB port J is not connected to a load device, the digital handshake unit 210 communicates with the load device that is connected to USB port K and determines whether or not to establish a handshake for a fast charging protocol with the load device that is connected to the USB port K. For example, if the load device connected to the USB port K is compatible with a fast charging protocol, the digital handshake unit 210 determines to establish a handshake for the fast charging protocol with the load device connected to the USB port K and establishes a handshake for the fast charging protocol with the load device connected to the USB port K. As an example, if the load device connected to the USB port K is not compatible with a fast charging protocol, the digital handshake unit 210 determines not to establish a handshake for the fast charging protocol with the load device connected to the USB port K and the analog handshake unit 250 is used to determine whether or not to establish a handshake for a regular charging protocol that is not a fast charging protocol with the load device connected to the USB port K.

As shown in FIG. 2, the detection signal 261 is received by the analog handshake unit 250, which is connected to the terminal 280 (e.g., a positive data pin), the terminal 290 (e.g., a positive data pin), the terminal 282 (e.g., a negative data pin) and the terminal 292 (e.g., a negative data pin) according to some embodiments. In certain embodiments, if the detection signal 261 indicates that the USB port J is connected to a load device and the USB port K is connected to another load device, the analog handshake unit 250 communicates with the load device connected to the USB port J to determine whether or not to establish a handshake for a regular charging protocol that is not a fast charging protocol with the load device connected to the USB port J, and the analog handshake unit 250 also communicates with the load device connected to the USB port K to determine whether or not to establish a handshake for a regular charging protocol that is not a fast charging protocol with the load device connected to the USB port K.

In some examples, if the detection signal 261 indicates that the USB port J is connected to a load device and the USB port K is connected to another load device, the analog handshake unit 250 determines whether the load device connected to the USB port J is compatible with the Apple 2.4A charging protocol, and if the load device connected to the USB port J is not compatible with the Apple 2.4A charging protocol, and further determines whether the load device connected to the USB port J is compatible with the BC 1.2 charging protocol. For example, if the analog handshake unit 250 determines that the load device connected to the USB port J is compatible with the Apple 2.4A charging protocol, the analog handshake unit 250 determines to establish a handshake for the Apple 2.4A charging protocol with the load device connected to the USB port J, and if the analog handshake unit 250 determines that the load device connected to the USB port J is not compatible with the Apple 2.4A charging protocol, the analog handshake unit 250 determines not to establish a handshake for the Apple 2.4A charging protocol with the load device connected to the USB port J. As an example, if the analog handshake unit 250 determines that the load device connected to the USB port J is compatible with the BC 1.2 charging protocol, the analog handshake unit 250 determines to establish a handshake for the BC 1.2 charging protocol with the load device connected to the USB port J, and if the analog handshake unit 250 determines that the load device connected to the USB port J is not compatible with the BC 1.2 charging protocol, the analog handshake unit 250 determines not to establish a handshake for the BC 1.2 charging protocol with the load device connected to the USB port J.

In certain examples, if the detection signal 261 indicates that the USB port J is connected to a load device and the USB port K is connected to another load device, the analog handshake unit 250 determines whether the load device connected to the USB port K is compatible with the Apple 2.4A charging protocol, and if the load device connected to the USB port K is not compatible with the Apple 2.4A charging protocol, and further determines whether the load device connected to the USB port K is compatible with the BC 1.2 charging protocol. For example, if the analog handshake unit 250 determines that the load device connected to the USB port K is compatible with the Apple 2.4A charging protocol, the analog handshake unit 250 determines to establish a handshake for the Apple 2.4A charging protocol with the load device connected to the USB port K, and if the analog handshake unit 250 determines that the load device connected to the USB port K is not compatible with the Apple 2.4A charging protocol, the analog handshake unit 250 determines not to establish a handshake for the Apple 2.4A charging protocol with the load device connected to the USB port K. As an example, if the analog handshake unit 250 determines that the load device connected to the USB port K is compatible with the BC 1.2 charging protocol, the analog handshake unit 250 determines to establish a handshake for the BC 1.2 charging protocol with the load device connected to the USB port K, and if the analog handshake unit 250 determines that the load device connected to the USB port K is not compatible with the BC 1.2 charging protocol, the analog handshake unit 250 determines not to establish a handshake for the BC 1.2 charging protocol with the load device connected to the USB port K.

According to certain embodiments, if the detection signal 261 indicates that the USB port J is connected to a load device but the USB port K is not connected to a load device and the digital handshake unit 210 does not establish any handshake for a fast charging protocol with the load device connected to the USB port J, the analog handshake unit 250 communicates with the load device connected to the USB port J to determine whether or not to establish a handshake for a regular charging protocol that is not a fast charging protocol with the load device connected to the USB port J. In some examples, if the detection signal 261 indicates that the USB port J is connected to a load device but the USB port K is not connected to a load device and the digital handshake unit 210 does not establish any handshake for a fast charging protocol with the load device connected to the USB port J, the analog handshake unit 250 determines whether the load device connected to the USB port J is compatible with the Apple 2.4A charging protocol, and if the load device connected to the USB port J is not compatible with the Apple 2.4A charging protocol, and further determines whether the load device connected to the USB port J is compatible with the BC 1.2 charging protocol. For example, if the analog handshake unit 250 determines that the load device connected to the USB port J is compatible with the Apple 2.4A charging protocol, the analog handshake unit 250 determines to establish a handshake for the Apple 2.4A charging protocol with the load device connected to the USB port J, and if the analog handshake unit 250 determines that the load device connected to the USB port J is not compatible with the Apple 2.4A charging protocol, the analog handshake unit 250 determines not to establish a handshake for the Apple 2.4A charging protocol with the load device connected to the USB port J. As an example, if the analog handshake unit 250 determines that the load device connected to the USB port J is compatible with the BC 1.2 charging protocol, the analog handshake unit 250 determines to establish a handshake for the BC 1.2 charging protocol with the load device connected to the USB port J, and if the analog handshake unit 250 determines that the load device connected to the USB port J is not compatible with the BC 1.2 charging protocol, the analog handshake unit 250 determines not to establish a handshake for the BC 1.2 charging protocol with the load device connected to the USB port J.

According to some embodiments, if the detection signal 261 indicates that the USB port K is connected to a load device but the USB port J is not connected to a load device and the digital handshake unit 210 does not establish any handshake for a fast charging protocol with the load device connected to the USB port K, the analog handshake unit 250 communicates with the load device connected to the USB port K to determine whether or not to establish a handshake for a regular charging protocol that is not a fast charging protocol with the load device connected to the USB port K. In certain examples, if the detection signal 261 indicates that the USB port K is connected to a load device but the USB port J is not connected to a load device and the digital handshake unit 210 does not establish any handshake for a fast charging protocol with the load device connected to the USB port K, the analog handshake unit 250 determines whether the load device connected to the USB port K is compatible with the Apple 2.4A charging protocol, and if the load device connected to the USB port K is not compatible with the Apple 2.4A charging protocol, and further determines whether the load device connected to the USB port K is compatible with the BC 1.2 charging protocol. For example, if the analog handshake unit 250 determines that the load device connected to the USB port K is compatible with the Apple 2.4A charging protocol, the analog handshake unit 250 determines to establish a handshake for the Apple 2.4A charging protocol with the load device connected to the USB port K, and if the analog handshake unit 250 determines that the load device connected to the USB port K is not compatible with the Apple 2.4A charging protocol, the analog handshake unit 250 determines not to establish a handshake for the Apple 2.4A charging protocol with the load device connected to the USB port K. As an example, if the analog handshake unit 250 determines that the load device connected to the USB port K is compatible with the BC 1.2 charging protocol, the analog handshake unit 250 determines to establish a handshake for the BC 1.2 charging protocol with the load device connected to the USB port K, and if the analog handshake unit 250 determines that the load device connected to the USB port K is not compatible with the BC 1.2 charging protocol, the analog handshake unit 250 determines not to establish a handshake for the BC 1.2 charging protocol with the load device connected to the USB port K.

In certain embodiments, if the detection signal 261 indicates that neither the USB port J nor the USB port K is connected to a load device, neither the digital handshake unit 210 nor the analog handshake unit 250 is used to establish any handshake for any charging protocol.

As discussed above and further emphasized here, FIG. 2 is merely an example, which should not unduly limit the scope of the claims. One of ordinary skill in the art would recognize many variations, alternatives, and modifications. In certain embodiments, the handshake controller 200 is a part of the multiport fast charger that includes N USB ports, wherein N is an integer larger than 1. For example, the N USB ports include the USB port J, the USB port K, and one or more additional USB ports. As an example, the port detection unit 260 is connected to each USB port of the N USB ports. In some examples, the port detection unit 260 determines whether only one USB port of the N USB ports is connected to a load device and all other USB ports of the N USB ports are not connected to any load device. For example, if only one USB port of the N USB ports is connected to a load device and all other USB ports of the N USB ports are not connected to any load device, that only one USB port is connected to the input/output interface unit 220 through the port selection unit 240, so that the port selection unit 240 enables signal communication between that only one USB port and the digital handshake unit 210 to determine whether or not to establish a handshake for a fast charging protocol with the load device that is connected to that only one USB port. For example, if the load device that is connected to that only one USB port is compatible with a fast charging protocol, the digital handshake unit 210 establishes a handshake for the fast charging protocol with the load device that is connected to that only one USB port.

As an example, if the load device that is connected to that only one USB port is not compatible with a fast charging protocol, the digital handshake unit 210 does not establish a handshake for the fast charging protocol with the load device that is connected to that only one USB port and the analog handshake unit 250 is used to determine whether or not to establish a handshake for a regular charging protocol that is not a fast charging protocol with the load device that is connected to that only one USB port.

In certain examples, the port detection unit 260 determines whether two or more USB ports of the N USB ports are connected to two or more load devices respectively. For example, the two or more USB ports are some USB ports, not all USB ports, of the N USB ports, or the two or more USB ports are all USB ports of the N USB ports. As an example, if two or more USB ports of the N USB ports are connected to two or more load devices respectively, the analog handshake unit 250 communicates with each load device of the two or more load devices connected to the two or more USB ports respectively to determine whether or not to establish a handshake for a regular charging protocol that is not a fast charging protocol with each load device of the two or more load devices connected to the two or more USB ports respectively.

FIG. 3A, FIG. 3B, and FIG. 3C are simplified diagrams showing signal communications between one or more devices connected to one or more USB ports with the handshake controller 200 as shown in FIG. 2 according to some embodiments of the present invention. These diagrams are merely examples, which should not unduly limit the scope of the claims. One of ordinary skill in the art would recognize many variations, alternatives, and modifications.

As shown in FIG. 3A, if the USB port J is connected to a load device but the USB port K is not connected to a load device, the terminal 280 (e.g., a positive data pin) and the terminal 282 (e.g., a negative data pin) communicate with the digital handshake unit 210 through the port selection unit 240 and the input/output interface unit 220 according to certain embodiments. For example, as shown in FIG. 3A, the terminal 280 (e.g., a positive data pin) and the terminal 282 (e.g., a negative data pin) send one or more signals to the digital handshake unit 210 and/or receive one or more signals from the digital handshake unit 210, through the port selection unit 240 and the input/output interface unit 220. As an example, as shown in FIG. 3A, the digital handshake unit 210 communicates with the load device that is connected to USB port J and determines whether or not to establish a handshake for a fast charging protocol with the load device that is connected to the USB port J.

As shown in FIG. 3B, if the USB port K is connected to a load device but the USB port J is not connected to a load device, the terminal 290 (e.g., a positive data pin) and the terminal 292 (e.g., a negative data pin) communicate with the digital handshake unit 210 through the port selection unit 240 and the input/output interface unit 220 according to some embodiments. For example, as shown in FIG. 3B, the terminal 290 (e.g., a positive data pin) and the terminal 292 (e.g., a negative data pin) send one or more signals to the digital handshake unit 210 and/or receive one or more signals from the digital handshake unit 210, through the port selection unit 240 and the input/output interface unit 220. As an example, as shown in FIG. 3B, the digital handshake unit 210 communicates with the load device that is connected to USB port K and determines whether or not to establish a handshake for a fast charging protocol with the load device that is connected to the USB port K.

As shown in FIG. 3C, if the USB port J is connected to a load device and the USB port K is connected to another load device, the terminal 280 (e.g., a positive data pin), the terminal 282 (e.g., a negative data pin), the terminal 290 (e.g., a positive data pin) and the terminal 292 (e.g., a negative data pin) communicate with the analog handshake unit 250 according to certain embodiments. For example, as shown in FIG. 3C, the terminal 280 (e.g., a positive data pin), the terminal 282 (e.g., a negative data pin), the terminal 290 (e.g., a positive data pin) and the terminal 292 (e.g., a negative data pin) send one or more signals to the analog handshake unit 250 and/or receive one or more signals from the analog handshake unit 250. As an example, the analog handshake unit 250 communicates with the load device connected to the USB port J to determine whether or not to establish a handshake for a regular charging protocol that is not a fast charging protocol with the load device connected to the USB port J, and the analog handshake unit 250 also communicates with the load device connected to the USB port K to determine whether or not to establish a handshake for a regular charging protocol that is not a fast charging protocol with the load device connected to the USB port K.

FIG. 4 is a simplified diagram showing certain components of the port selection unit 240 as part of the handshake controller 200 as shown in FIG. 2 according to certain embodiments of the present invention. This diagram is merely an example, which should not unduly limit the scope of the claims. One of ordinary skill in the art would recognize many variations, alternatives, and modifications. The port selection unit 240 includes the port selection subunit 242 and the port selection subunit 244. The port selection subunit 242 includes switches 410 and 420 and a transistor 450, and the port selection subunit 244 includes switches 430 and 440 and a transistor 460. Although the above has been shown using a selected group of components for the port selection unit 240, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some examples, the switch 410 includes terminals 412 and 414, and the switch 420 includes terminals 422 and 424. For example, the transistor 450 is a PMOS transistor, which includes a gate terminal 452, a source terminal 454, and a drain terminal 456. In certain examples, the switch 430 includes terminals 432 and 434, and the switch 440 includes terminals 442 and 444. For example, the transistor 460 is a PMOS transistor, which includes a gate terminal 462, a source terminal 464, and a drain terminal 466.

According to certain embodiments, the terminal 412 of the switch 410 is connected to the terminal 280, and the terminal 422 of the switch 420 is connected to the terminal 290. In some examples, the terminal 414 of the switch 410, the terminal 424 of the switch 420, and the drain terminal 456 of the PMOS transistor 450 are all connected to the terminal 241. In certain examples, the source terminal 454 of the transistor 450 is biased to a supply voltage 490, and the gate terminal 452 of the transistor 450 receives a drive signal 453. For example, if the PMOS transistor 450 is turned on, the drain terminal 456 is biased to the supply voltage 490.

According to some embodiments, the terminal 432 of the switch 430 is connected to the terminal 282, and the terminal 442 of the switch 440 is connected to the terminal 292. In certain examples, the terminal 434 of the switch 430, the terminal 444 of the switch 440, and the drain terminal 466 of the PMOS transistor 460 are all connected to the terminal 243. In some examples, the source terminal 464 of the transistor 460 is biased to the supply voltage 490, and the gate terminal 462 of the transistor 460 receives a drive signal 463. For example, if the PMOS transistor 460 is turned on, the drain terminal 466 is biased to the supply voltage 490.

In certain embodiments, if the detection signal 261 indicates that the USB port J is connected to a load device but the USB port K is not connected to a load device, the switch 410 is closed, the switch 420 is open, the switch 430 is closed, the switch 440 is open, and the transistors 450 and 460 are both open (e.g., turned off). For example, if the detection signal 261 indicates that the USB port J is connected to a load device but the USB port K is not connected to a load device, one or more signals 425 that are outputted at the terminal 241 are the same as one or more signals received by the terminal 280. As an example, if the detection signal 261 indicates that the USB port J is connected to a load device but the USB port K is not connected to a load device, one or more signals 445 that are outputted at the terminal 243 are the same as one or more signals received by the terminal 282.

In some embodiments, if the detection signal 261 indicates that the USB port K is connected to a load device but the USB port J is not connected to a load device, the switch 410 is open, the switch 420 is closed, the switch 430 is open, the switch 440 is closed, and the transistors 450 and 460 are both open (e.g., turned off). For example, if the detection signal 261 indicates that the USB port K is connected to a load device but the USB port J is not connected to a load device, one or more signals 445 that are outputted at the terminal 243 are the same as one or more signals received by the terminal 290. As an example, if the detection signal 261 indicates that the USB port K is connected to a load device but the USB port J is not connected to a load device, one or more signals 445 that are outputted at the terminal 243 are the same as one or more signals received by the terminal 292.

According to certain embodiments, if the detection signal 261 indicates that the USB port J is connected to a load device and the USB port K is connected to another load device, the switch 410 is open, the switch 420 is open, the switch 430 is open, the switch 440 is open, and the transistors 450 and 460 are both closed (e.g., turned on). According to some embodiments, if the detection signal 261 indicates that neither the USB port J nor the USB port K is connected to a load device, the switch 410 is open, the switch 420 is open, the switch 430 is open, the switch 440 is open, and the transistors 450 and 460 are both closed (e.g., turned on).

FIG. 5 is a simplified diagram showing certain components of the analog handshake unit 250 as part of the handshake controller 200 as shown in FIG. 2 according to certain embodiments of the present invention. This diagram is merely an example, which should not unduly limit the scope of the claims. One of ordinary skill in the art would recognize many variations, alternatives, and modifications. The analog handshake unit 250 includes a protocol detection subunit 510, a switch controller 520, a gate controller 526, a buffer 530, switches 540, 550, 560 and 570, resistors 546, 556, 566 and 576, and transistors 580 and 590. Although the above has been shown using a selected group of components for the analog handshake unit 250, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the buffer 530 includes a non-inverting input terminal 532 (e.g., a "+" terminal), an inverting input terminal 534 (e.g., a "−" terminal), and an output terminal 536. For example, the non-inverting input terminal 532 (e.g., a "+" terminal) is biased to a predetermined constant voltage 533 (e.g., 2.7 volts), and the inverting input terminal 534 (e.g., a "−" terminal) is connected to the output terminal 536. As an example, a voltage 537 at the output terminal 536 is equal to the predetermined constant voltage 533 (e.g., 2.7 volts). In certain examples, the switch 540 includes terminals 542 and 544, the switch 550 includes terminals 552 and 554, the switch 560 includes terminals 562 and 564, and the switch 570 includes terminals 572 and 574. For example, the terminals 542, 552, 562 and 572 are connected to the output terminal 536 of the buffer 530. In some examples, the resistor 546 includes terminals 548 and 549, the resistor 556 includes terminals 558 and 559, the resistor 566 includes terminals 568 and 569, and the resistor 576 includes terminals 578 and 579. For example, the terminal 544 is connected to the terminal 548, the terminal 554 is connected to the terminal 558, the terminal 564 is connected to the terminal 568, and the terminal 574 is connected to the terminal 578.

In certain embodiments, the transistor 580 is an NMOS transistor including a gate terminal 582, a drain terminal 584, and a source terminal 586, and the transistor 590 is an NMOS transistor including a gate terminal 592, a drain terminal 594, and a source terminal 596. For example, the terminal 549 is connected to the drain terminal 584 and the terminal 280, and the terminal 559 is connected to the source terminal 586 and the terminal 282. As an example, the terminal 569 is connected to the drain terminal 594 and the terminal 290, and the terminal 579 is connected to the source terminal 596 and the terminal 292.

According to certain embodiments, the protocol detection subunit 510 generates detection signals 511 and 513. In some examples, the switch controller 520 receives the detection signal 511 and the detection signal 261 and generates switch control signals 521 and 523 based at least in part on the detection signal 511 and/or the detection signal 261. For example, the switch control signal 521 closes the switches 540 and 550 and/or opens the switches 540 and 550. As an example, the switch control signal 523 closes the switches 560 and 570 and/or opens the switches 560 and 570. According to some embodiments, the gate controller 526 receives the detection signal 513 and the detection signal 261 and generates gate control signals 525 and 527 based at least in part on the detection signal 513 and/or the detection signal 261. For example, the gate control signal 525 is received by the gate terminal 582 to turn on and/or turn off the transistor 580. As an example, the gate control signal 527 is received by the gate terminal 592 to turn on and/or turn off the transistor 590.

In some embodiments, if the detection signal 261 indicates that neither the USB port J nor the USB port K is connected to a load device, the switch controller 520 generates the switch control signals 521 and 523 based at least in part on the detection signal 261 regardless of the detection signal 511, and the gate controller 526 generates the gate control signals 525 and 527 based at least in part on the detection signal 261 regardless of the detection signal 513. For example, if the detection signal 261 indicates that neither the USB port J nor the USB port K is connected to a load device, the switch controller 520 generates the switch control signals 521 and 523 to keep the switches 540, 550, 560 and 570 all closed regardless of the detection signal 511, and the gate controller 526 generates the gate control signals 525 and 527 to keep the transistors 580 and 590 both turned off regardless of the detection signal 513. As an example, if the detection signal 261 indicates that neither the USB port J nor the USB port K is connected to a load device, the terminals 280, 282, 290 and 292 are all biased at the predetermined constant voltage 533 (e.g., 2.7 volts).

In certain embodiments, if the detection signal 261 indicates that the USB port J is connected to a load device and/or the USB port K is connected to another load device, the switch controller 520 generates the switch control signals 521 and 523 based at least in part on the detection signal 511 and the detection signal 261, and the gate controller 526 generates the gate control signals 525 and 527 based at least in part on the detection signal 513 and the detection signal 261. In some examples, if the detection signal 261 indicates that the USB port J is connected to a load device and/or the USB port K is connected to another load device, the switches 540, 550, 560 and 570 are all closed and the transistors 580 and 590 are both turned off. For example, if the detection signal 261 indicates that the USB port J is connected to a load device and the USB port K is also connected to another load device, afterwards the protocol detection subunit 510 determines whether the load device connected to the USB port J is compatible with the Apple 2.4A charging protocol and whether the load device connected to the USB port K is compatible with the Apple 2.4A charging protocol. As an example, if the detection signal 261 indicates that the USB port J is connected to a load device but the USB port K is not connected to a load device and the digital handshake unit 210 does not establish any handshake for a fast charging protocol with the load device connected to the USB port J, afterwards the protocol detection subunit 510 determines whether the load device connected to the USB port J is compatible with the Apple 2.4A charging protocol. For example, if the detection signal 261 indicates that the USB port K is connected to a load device but the USB port J is not connected to a load device and the digital handshake unit 210 does not establish any handshake for a fast charging protocol with the load device connected to the USB port K, afterwards the protocol detection subunit 510 determines whether the load device connected to the USB port K is compatible with the Apple 2.4A charging protocol.

According to some embodiments, with the predetermined constant voltage 533 being equal to 2.7 volts, if the terminals 280 and 282 both remain biased at 2.7 volts during a predetermined time duration (e.g., $T_0$), the protocol detection subunit 510 determines that the load device connected to the USB port J is compatible with the Apple 2.4A charging protocol, and if any of the terminals 280 and 282 does not remain biased at 2.7 volts during the predetermined time duration (e.g., $T_0$), the protocol detection subunit 510 determines that the load device connected to the USB port J is not compatible with the Apple 2.4A charging protocol. For example, if the USB port J is determined compatible with the Apple 2.4A charging protocol, the switches 540 and 550 both remain closed and the transistor 580 remains turned off. As an example, if the USB port J is determined not compatible with the Apple 2.4A charging protocol, the switches 540 and 550 both become open and the transistor 580 becomes turned on, and afterwards, the protocol detection subunit 510 determines whether the load device connected to the USB port J is compatible with the BC 1.2 charging protocol based at least a voltage of the terminal 280 and a voltage of the terminal 282.

According to certain embodiments, with the predetermined constant voltage 533 being equal to 2.7 volts, if the terminals 290 and 292 both remain biased at 2.7 volts during the predetermined time duration (e.g., $T_0$), the protocol detection subunit 510 determines that the load device connected to the USB port K is compatible with the Apple 2.4A charging protocol, and if any of the terminals 290 and 292 does not remain biased at 2.7 volts during the predetermined time duration (e.g., $T_0$), the protocol detection subunit 510 determines that the load device connected to the USB port K is not compatible with the Apple 2.4A charging protocol. For example, if the USB port K is determined compatible with the Apple 2.4A charging protocol, the switches 560 and 570 both remain closed and the transistor 590 remains turned off. As an example, if the USB port K is determined not compatible with the Apple 2.4A charging protocol, the switches 560 and 570 both become open and the transistor 590 becomes turned on, and afterwards, the protocol detection subunit 510 determines whether the load device connected to the USB port K is compatible with the BC 1.2 charging protocol based at least a voltage of the terminal 290 and a voltage of the terminal 292.

FIG. 6 is a simplified diagram showing a method for the USB port J and/or the USB port K performed by the analog handshake unit 250 as part of the handshake controller 200 as shown in FIG. 2 according to some embodiments of the present invention. This diagram is merely an example, which should not unduly limit the scope of the claims. One of ordinary skill in the art would recognize many variations, alternatives, and modifications. The method 600 includes a process 610 for closing multiple switches and turning off one or more transistors, a process 620 for determining whether one or more load devices are compatible with the Apple 2.4A charging protocol, a process 630 for keeping multiple switches closed and one or more transistors turned off and providing communications between the analog handshake unit 250 and one or more load devices, a process 640 for changing multiple switches from being closed to being open and changing one or more transistors from being turned off to being turned on, a process 650 for determining whether one or more load devices are compatible with the BC 1.2 charging protocol, and a process 660 for keeping multiple switches open and one or more transistors turned on and providing communications between the analog handshake unit 250 and one or more load devices. Although the above has been shown using a selected group of components for the analog handshake unit 250, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the method 600 is performed for the USB port J if the detection signal 261 indicates that the USB port J is connected to a load device and the USB port K is also connected to another load device, or if the detection signal 261 indicates that the USB port J is connected to a load device but the USB port K is not connected to a load device and the digital handshake unit 210 does not establish any handshake for a fast charging protocol with the load device connected to the USB port J. At the process 610, for the USB port J, the switches 540 and 550 are closed and the transistor 580 is turned off according to certain embodiments. At the process 620, during the predetermined time duration (e.g., $T_0$), whether the load device connected to the USB port J is compatible with the Apple 2.4A charging protocol is determined according to some embodiments. In certain examples, if the terminals 280 and 282 both remain biased at 2.7 volts during the predetermined time duration (e.g., $T_0$), the protocol detection subunit 510 determines that the load device connected to the USB port J is compatible with the Apple 2.4A charging protocol, and if any of the terminals 280 and 282 does not remain biased at 2.7 volts during the predetermined time duration (e.g., $T_0$), the protocol detection subunit 510 determines that the load device connected to the USB port J is not compatible with the Apple 2.4A charging protocol. For example, if the load device connected to the USB port J is determined to be compatible with the Apple 2.4A charging protocol, the process 630 is performed. As an example, if the load device connected to the USB port J is determined to be not compatible with the Apple 2.4A charging protocol, the process 640 is performed. At the process 630, the switches 540 and 550 remain closed and the transistor 580 remains turned off, and the analog handshake unit 250 communicates with the load device connected to the USB port J according to certain embodiments. At the process 640, the switches 540 and 550 become open and the transistor 580 becomes turned on according to some embodiments. At the process 650, whether the load device connected to the USB port J is compatible with the BC 1.2 charging protocol is determined according to certain embodiments. For example, if the protocol detection subunit 510 determines that the load device connected to the USB port J is compatible with the BC 1.2 charging protocol, the process 660 is performed. As an example, if the protocol detection subunit 510 determines that the load device connected to the USB port J is not compatible with the BC 1.2 charging protocol, the process 650 is performed again. At the process 660, the switches 540 and 550 remain open and the transistor 580 remains turned on, and the analog handshake unit 250 communicates with the load device connected to the USB port J according to certain embodiments.

In certain embodiments, the method 600 is performed for the USB port K if the detection signal 261 indicates that the USB port J is connected to a load device and the USB port K is also connected to another load device, or if the detection signal 261 indicates that the USB port J is connected to a load device but the USB port K is not connected to a load device and the digital handshake unit 210 does not establish any handshake for a fast charging protocol with the load device connected to the USB port J. At the process 610, for the USB port K, the switches 560 and 570 are closed and the transistor 590 is turned off according to certain embodiments. At the process 620, during the predetermined time duration (e.g., $T_0$), whether the load device connected to the USB port K is compatible with the Apple 2.4A charging protocol is determined according to some embodiments. In certain examples, if the terminals 290 and 292 both remain biased at 2.7 volts during the predetermined time duration (e.g., $T_0$), the protocol detection subunit 510 determines that the load device connected to the USB port K is compatible with the Apple 2.4A charging protocol, and if any of the terminals 290 and 292 does not remain biased at 2.7 volts during the predetermined time duration (e.g., $T_0$), the protocol detection subunit 510 determines that the load device connected to the USB port K is not compatible with the Apple 2.4A charging protocol. For example, if the load device connected to the USB port K is determined to be compatible with the Apple 2.4A charging protocol, the process 630 is performed. As an example, if the load device connected to the USB port K is determined to be not compatible with the Apple 2.4A charging protocol, the process 640 is performed. At the process 630, the switches 560 and 570 remain closed and the transistor 590 remains turned off, and the analog handshake unit 250 communicates with the load device connected to the USB port K according to certain embodiments. At the process 640, the switches 560 and 570 become open and the transistor 590 becomes turned on according to some embodiments. At the process 650, whether the load device connected to the USB port K is compatible with the BC 1.2 charging protocol is determined according to certain embodiments. For example, if the protocol detection subunit 510 determines that the load device connected to the USB port K is compatible with the BC 1.2 charging protocol, the process 660 is performed. As an example, if the protocol detection subunit 510 determines that the load device connected to the USB port J is not compatible with the BC 1.2 charging protocol, the process 650 is performed again. At the process 660, the switches 560 and 570 remain open and the transistor 590 remains turned on, and the analog handshake unit 250 communicates with the load device connected to the USB port K according to certain embodiments.

According to certain embodiments, the regular charging protocol that is compatible with the load device connected to the USB port J and the regular charging protocol that is compatible with the load device connected to the USB port K are different. For example, the protocol detection subunit 510 determines that the load device connected to the USB port J is compatible with the Apple 2.4A charging protocol. As an example, the protocol detection subunit 510 determines that the load device connected to the USB port K is not compatible with the Apple 2.4A charging protocol but is compatible with the BC 1.2 charging protocol.

According to some embodiments, the regular charging protocol that is compatible with the load device connected to the USB port J and the regular charging protocol that is compatible with the load device connected to the USB port K are the same. For example, the protocol detection subunit 510 determines that the load device connected to the USB port J is compatible with the Apple 2.4A charging protocol and the load device connected to the USB port K is also compatible with the Apple 2.4A charging protocol. As an example, the protocol detection subunit 510 determines that the load device connected to the USB port J is not compatible with the Apple 2.4A charging protocol but is compatible with the BC 1.2 charging protocol, and the protocol detection subunit 510 also determines that the load device connected to the USB port K is not compatible with the Apple 2.4A charging protocol but is compatible with the BC 1.2 charging protocol.

FIG. 7 shows simplified timing diagrams for the analog handshake unit 250 as part of the handshake controller 200 as shown in FIG. 2 if the USB port J is connected to a load device and the USB port K is connected to another load device according to certain embodiments of the present invention. These diagrams are merely examples, which should not unduly limit the scope of the claims. One of ordinary skill in the art would recognize many variations, alternatives, and modifications. The waveform 710 represents a signal indicating whether the USB port J is connected to a load device as a function of time, the waveform 720 represents a signal indicating whether the USB port K is connected to a load device as a function of time, the waveform 730 represents the switch control signal 521 as a function of time, the waveform 740 represents the switch control signal 523 as a function of time, the waveform 750 represents the gate control signal 525 as a function of time, and the waveform 760 represents the gate control signal 527 as a function of time.

According to certain embodiments, the detection signal 261 includes the signal as represented by the waveform 710 and the signal as represented by the waveform 720. In some examples, if the signal as represented by the waveform 710 is at a logic low level (e.g., being equal to 0), the USB port J is not connected to a load device, and if the signal as represented by the waveform 710 is at a logic high level (e.g., being equal to 1), the USB port J is connected to a load device. In certain examples, if the signal as represented by the waveform 720 is at the logic low level (e.g., being equal to 0), the USB port K is not connected to a load device, and if the signal as represented by the waveform 720 is at the logic high level (e.g., being equal to 1), the USB port K is connected to a load device. For example, if the detection signal 261 is equal to 10, the USB port J is connected to a load device, but the USB port K is not connected to a load device. As an example, if the detection signal 261 is equal to 01, the USB port J is not connected to a load device, but the USB port K is connected to a load device. For example, if the detection signal 261 is equal to 11, the USB port J is connected to a load device and the USB port K is connected to another load device. As an example, if the detection signal 261 is equal to 00, neither the USB port J nor the USB port K is connected to a load device.

In some embodiments, before time $t_1$, the USB port J is not connected to a load device as shown by the waveform 710, and the USB port K is also not connected to a load device as shown by the waveform 720. For example, before time $t_1$, the switch control signal 521 is at the logic high level to close both switches 540 and 550 as shown by the waveform 730, and the switch control signal 523 is at the logic high level to close both switches 560 and 570 as shown by the waveform 740. As an example, before time $t_1$, the gate control signal 525 is at the logic low level to turn off the transistor 580 as shown by the waveform 750, and the gate control signal 527 is at the logic low level to turn off the transistor 590 as shown by the waveform 760.

In certain embodiments, at time $t_1$, the USB port J becomes connected to a load device as shown by the waveform 710, and the USB port K also becomes connected to a load device as shown by the waveform 720. For example, at time $t_1$, the switch control signal 521 remains at the logic high level to close both switches 540 and 550 as shown by the waveform 730, and the switch control signal 523 also remains at the logic high level to close both switches 560 and 570 as shown by the waveform 740. As an example, at time $t_1$, the gate control signal 525 remains at the logic low level to turn off the transistor 580 as shown by the waveform 750, and the gate control signal 527 also remains at the logic low level to turn off the transistor 590 as shown by the waveform 760.

In some embodiments, from time $t_1$ to time $t_2$, the USB port J remains connected to a load device as shown by the waveform 710, and the USB port K also remains connected to a load device as shown by the waveform 720. For example, from time $t_1$ to time $t_2$, the switch control signal 521 remains at the logic high level to keep both switches 540 and 550 closed as shown by the waveform 730, and the switch control signal 523 also remains at the logic high level to keep both switches 560 and 570 closed as shown by the waveform 740. As an example, from time $t_1$ to time $t_2$, the gate control signal 525 remains at the logic low level to keep the transistor 580 turned off as shown by the waveform 750, and the gate control signal 527 also remains at the logic low level to keep the transistor 590 turned off as shown by the waveform 760. In certain examples, time $t_2$ follows time $t_1$ by the predetermined time duration (e.g., $T_0$). In some examples, from time $t_1$ to time $t_2$ (e.g., during $T_0$), the protocol detection subunit 510 determines that the load device connected to the USB port J is not compatible with the Apple 2.4A charging protocol and the load device connected to the USB port K is also not compatible with the Apple 2.4A charging protocol.

In certain embodiments, at time $t_2$, the USB port J remains connected to a load device as shown by the waveform 710, and the USB port K also remains connected to a load device as shown by the waveform 720. For example, at time $t_2$, the switch control signal 521 changes from the logic high level to the logic low level to open both switches 540 and 550 as shown by the waveform 730, and the switch control signal 523 also changes from the logic high level to the logic low level to open both switches 560 and 570 as shown by the waveform 740. As an example, at time $t_2$, the gate control signal 525 changes from the logic low level to the logic high level to turn on the transistor 580 as shown by the waveform 750, and the gate control signal 527 also changes from the logic low level to the logic high level to turn on the transistor 590 as shown by the waveform 760.

In certain embodiments, after time $t_2$, the USB port J remains connected to a load device as shown by the waveform 710, and the USB port K also remains connected to a load device as shown by the waveform 720. For example, after time $t_2$, the switch control signal 521 remains at the logic low level to keep both switches 540 and 550 open as shown by the waveform 730, and the switch control signal 523 also remains at the logic low level to keep both switches 560 and 570 open as shown by the waveform 740. As an example, after time $t_2$, the gate control signal 525 remains at the logic high level to keep the transistor 580 turned on as shown by the waveform 750, and the gate control signal 527 also remains at the logic high level to keep the transistor 590 turned on as shown by the waveform 760. In some examples, after time $t_2$, the protocol detection subunit 510 determines whether the load device connected to the USB port J is compatible with the BC 1.2 charging protocol and whether the load device connected to the USB port K is compatible with the BC 1.2 charging protocol.

In some examples, at time $t_1$, the process 610 for closing multiple switches and turning off one or more transistors is performed for both the USB port J and the USB port K. In certain examples, from time $t_1$ to time $t_2$, the process 620 for determining whether one or more load devices are compatible with the Apple 2.4A charging protocol is performed for both the USB port J and the USB port K. In some examples, at time $t_2$, the process 640 for changing multiple switches from being closed to being open and changing one or more transistors from being turned off to being turned on is performed for both the USB port J and the USB port K. In certain examples, after time $t_2$, the process 650 for determining whether one or more load devices are compatible with the BC 1.2 charging protocol is performed for both the USB port J and the USB port K.

According to some embodiments, a handshake controller for one or more charging protocols includes: a port detection unit connected to a plurality of USB ports and configured to generate a detection signal; a port selection unit configured to receive the detection signal and connected to the plurality of USB ports; an interface unit connected to the port selection unit; and a digital handshake unit connected to the interface unit; wherein the port detection unit is further configured to: determine whether a single USB port of the plurality of USB ports is connected to a load device; and if the single USB port of the plurality of USB ports is connected to the load device and no other USB port of the plurality of USB ports is connected to any load device, generate the detection signal identifying the single USB port that is connected to the load device; wherein the port selection unit is further configured to, if the detection signal identifies the single USB port that is connected to the load device, connect the single USB port to the interface unit to establish one or more signal communications between the single USB port and the digital handshake unit through the interface unit. For example, the handshake controller is implemented according to at least FIG. 2.

As an example, the digital handshake unit is configured to, if the detection signal identifies the single USB port that is connected to the load device, determine whether or not to establish a handshake for a charging protocol with the load device. For example, wherein the charging protocol is a fast charting protocol.

As an example, the handshake controller further includes an analog handshake unit connected to the plurality of USB ports. For example, the port detection unit is further configured to: determine whether multiple USB ports of the plurality of USB ports are connected to multiple load devices respectively; and if the multiple USB ports of the plurality of USB ports are connected to the multiple load devices respectively, generate the detection signal identifying the multiple USB ports connected to the multiple load devices respectively. As an example, the multiple USB ports are some USB ports, not all USB ports, of the plurality of USB ports. For example, the multiple USB ports are all USB ports of the plurality of USB ports. As an example, the analog handshake unit is configured to, if the detection signal identifies the multiple USB ports connected to the multiple load devices respectively: with each load device of the multiple load devices, determine whether or not to establish a handshake for a charging protocol selected from one or more charging protocols.

For example, the multiple USB ports include a first USB port and a second USB port; and the multiple load devices include a first load device connected to the first USB port and a second load device connected to the second USB port. As an example, the analog handshake unit is further configured to, if the detection signal identifies the multiple USB ports connected to the multiple load devices respectively: determine whether or not to establish a first handshake for a first charging protocol with the first load device; and determine whether or not to establish a second handshake for a second charging protocol with the second load device; wherein: the first charging protocol is selected from one or more charging protocols; and the second charging protocol is selected from the one or more charging protocols. For example, the first charging protocol and the second charging protocol are the same. As an example, the first charging protocol and the second charging protocol are different.

As an example, the analog handshake unit is configured to, if the detection signal identifies the multiple USB ports connected to the multiple load devices respectively, for each load device of the multiple load devices, during a predetermined time duration, determine whether the each load device is compatible with a first charging protocol; and after the predetermined time duration, if the each load device is not compatible with the first charging protocol, determine whether the each load device is compatible with a second charging protocol; wherein the first charging protocol and the second charging protocol are different.

According to certain embodiments, a handshake control method for one or more charging protocols includes: determining, by a port detection unit, whether a single USB port of a plurality of USB ports is connected to a load device; if the single USB port of the plurality of USB ports is connected to the load device and no other USB port of the plurality of USB ports is connected to any load device, generating, by the port detection unit, a detection signal identifying the single USB port that is connected to the load device; receiving the detection signal by a port selection unit; and if the detection signal identifies the single USB port that is connected to the load device, connecting, by the port selection unit, the single USB port to an interface unit; and establishing one or more signal communications between the single USB port and the digital handshake unit through the interface unit. For example, the handshake control method is implemented according to at least FIG. 2.

As an example, the handshake control method further includes: if the detection signal identifies the single USB port that is connected to the load device, determining, by the digital handshake unit, whether or not to establish a handshake for a charging protocol with the load device. For example, the charging protocol is a fast charting protocol.

For example, the handshake control method further includes: determining, by the port detection unit, whether multiple USB ports of the plurality of USB ports are connected to multiple load devices respectively; and if the multiple USB ports of the plurality of USB ports are connected to the multiple load devices respectively, generating, by the port detection unit, the detection signal identifying the multiple USB ports connected to the multiple load devices respectively. As an example, the multiple USB ports are some USB ports, not all USB ports, of the plurality of USB ports. For example, the multiple USB ports are all USB ports of the plurality of USB ports. As an example, the handshake control method further includes: if the detection signal identifies the multiple USB ports connected to the multiple load devices respectively, with each load device of the multiple load devices, determining, by an analog handshake unit connected to the plurality of USB ports, whether or not to establish a handshake for a charging protocol selected from one or more charging protocols.

For example, the multiple USB ports include a first USB port and a second USB port; and the multiple load devices include a first load device connected to the first USB port and a second load device connected to the second USB port. As an example, the handshake control method further includes: if the detection signal identifies the multiple USB ports connected to the multiple load devices respectively, determining, by an analog handshake unit connected to the plurality of USB ports, whether or not to establish a first handshake for a first charging protocol with the first load device; and determining, by the analog handshake unit, whether or not to establish a second handshake for a second charging protocol with the second load device; wherein: the first charging protocol is selected from one or more charging protocols; and the second charging protocol is selected from the one or more charging protocols. For example, the first charging protocol and the second charging protocol are the same. As an example, the first charging protocol and the second charging protocol are different.

For example, the handshake control method further includes, if the detection signal identifies the multiple USB ports connected to the multiple load devices respectively, for each load device of the multiple load devices: during a predetermined time duration, determining, by an analog handshake unit connected to the plurality of USB ports, whether the each load device is compatible with a first charging protocol; and after the predetermined time duration, if the each load device is not compatible with the first charging protocol, determining, by the analog handshake unit, whether the each load device is compatible with a second charging protocol; wherein the first charging protocol and the second charging protocol are different.

In certain examples, some or all components of various embodiments of the present invention each are, individually and/or in combination with at least another component, implemented using one or more software components, one or more hardware components, and/or one or more combinations of software and hardware components. In some examples, some or all components of various embodiments of the present invention each are, individually and/or in combination with at least another component, implemented in one or more circuits, such as one or more analog circuits and/or one or more digital circuits. For example, the input/output interface unit 220, the digital handshake unit 210, the port selection unit 240, the analog handshake unit 250, and/or the port detection unit 260 is implemented in one or more circuits. As an example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A handshake controller for one or more charging protocols, the handshake controller comprising:
    a port detection unit connected to a plurality of USB ports and configured to generate a detection signal;
    a port selection unit configured to receive the detection signal and connected to the plurality of USB ports;
    an interface unit connected to the port selection unit; and
    a digital handshake unit connected to the interface unit;
    wherein the port detection unit is further configured to:
        determine whether a single USB port of the plurality of USB ports is connected to a load device; and
        if the single USB port of the plurality of USB ports is connected to the load device and no other USB port of the plurality of USB ports is connected to any load device, generate the detection signal identifying the single USB port that is connected to the load device;
    wherein the port selection unit is further configured to, if the detection signal identifies the single USB port that is connected to the load device, connect the single USB port to the interface unit to establish one or more signal communications between the single USB port and the digital handshake unit through the interface unit;
    wherein the port detection unit is further configured to:
        determine whether multiple USB ports of the plurality of USB ports are connected to multiple load devices respectively; and
        if the multiple USB ports of the plurality of USB ports are connected to the multiple load devices respectively, generate the detection signal identifying the multiple USB ports connected to the multiple load devices respectively.

2. The handshake controller of claim 1 wherein the multiple USB ports are some USB ports, not all USB ports, of the plurality of USB ports.

3. The handshake controller of claim 1 wherein the multiple USB ports are all USB ports of the plurality of USB ports.

4. The handshake controller of claim 1, further comprising:
    an analog handshake unit connected to the plurality of USB ports;
    wherein the analog handshake unit is configured to, if the detection signal identifies the multiple USB ports connected to the multiple load devices respectively:
        with each load device of the multiple load devices, determine whether or not to establish a handshake for a charging protocol selected from one or more charging protocols.

5. The handshake controller of claim 1 wherein:
    the multiple USB ports include a first USB port and a second USB port; and
    the multiple load devices include a first load device connected to the first USB port and a second load device connected to the second USB port.

6. The handshake controller of claim 5, further comprising:
    an analog handshake unit connected to the plurality of USB ports;
    wherein the analog handshake unit is further configured to, if the detection signal identifies the multiple USB ports connected to the multiple load devices respectively:
        determine whether or not to establish a first handshake for a first charging protocol with the first load device; and
        determine whether or not to establish a second handshake for a second charging protocol with the second load device;
    wherein:
        the first charging protocol is selected from one or more charging protocols; and
        the second charging protocol is selected from the one or more charging protocols.

7. The handshake controller of claim 6 wherein the first charging protocol and the second charging protocol are the same.

8. The handshake controller of claim 6 wherein the first charging protocol and the second charging protocol are different.

9. The handshake controller of claim 1, further comprising:
    an analog handshake unit connected to the plurality of USB ports;
    wherein the analog handshake unit is configured to, if the detection signal identifies the multiple USB ports connected to the multiple load devices respectively, for each load device of the multiple load devices;
        during a predetermined time duration, determine whether the each load device is compatible with a first charging protocol; and
        after the predetermined time duration, if the each load device is not compatible with the first charging protocol, determine whether the each load device is compatible with a second charging protocol;
    wherein the first charging protocol and the second charging protocol are different.

10. A handshake control method for one or more charging protocols, the handshake control method comprising:
    determining, by a port detection unit, whether a single USB port of a plurality of USB ports is connected to a load device;
    if the single USB port of the plurality of USB ports is connected to the load device and no other USB port of the plurality of USB ports is connected to any load device, generating, by the port detection unit, a detection signal identifying the single USB port that is connected to the load device;

receiving the detection signal by a port selection unit;

if the detection signal identifies the single USB port that is connected to the load device,
- connecting, by the port selection unit, the single USB port to an interface unit; and
- establishing one or more signal communications between the single USB port and a digital handshake unit through the interface unit;

determining, by the port detection unit, whether multiple USB ports of the plurality of USB ports are connected to multiple load devices respectively; and if the multiple USB ports of the plurality of USB ports are connected to the multiple load devices respectively, generating, by the port detection unit, the detection signal identifying the multiple USB ports connected to the multiple load devices respectively.

11. The handshake control method of claim 10 wherein the multiple USB ports are some USB ports, not all USB ports, of the plurality of USB ports.

12. The handshake control method of claim 10 wherein the multiple USB ports are all USB ports of the plurality of USB ports.

13. The handshake control method of claim 10, and further comprising:
- if the detection signal identifies the multiple USB ports connected to the multiple load devices respectively, with each load device of the multiple load devices, determining, by an analog handshake unit connected to the plurality of USB ports, whether or not to establish a handshake for a charging protocol selected from one or more charging protocols.

14. The handshake control method of claim 10 wherein:
- the multiple USB ports include a first USB port and a second USB port; and
- the multiple load devices include a first load device connected to the first USB port and a second load device connected to the second USB port.

15. The handshake control method of claim 14, and further comprising:
- if the detection signal identifies the multiple USB ports connected to the multiple load devices respectively,
  - determining, by an analog handshake unit connected to the plurality of USB ports, whether or not to establish a first handshake for a first charging protocol with the first load device; and
  - determining, by the analog handshake unit, whether or not to establish a second handshake for a second charging protocol with the second load device;
- wherein:
  - the first charging protocol is selected from one or more charging protocols; and
  - the second charging protocol is selected from the one or more charging protocols.

16. The handshake control method of claim 15 wherein the first charging protocol and the second charging protocol are the same.

17. The handshake control method of claim 15 wherein the first charging protocol and the second charging protocol are different.

18. The handshake control method of claim 10, and further comprising, if the detection signal identifies the multiple USB ports connected to the multiple load devices respectively, for each load device of the multiple load devices:
- during a predetermined time duration, determining, by an analog handshake unit connected to the plurality of USB ports, whether the each load device is compatible with a first charging protocol; and
- after the predetermined time duration, if the each load device is not compatible with the first charging protocol, determining, by the analog handshake unit, whether the each load device is compatible with a second charging protocol;
- wherein the first charging protocol and the second charging protocol are different.

* * * * *